United States Patent [19]

Kadelbach et al.

[11] 4,233,860
[45] Nov. 18, 1980

[54] CONTROL SYSTEM FOR AUTOMOTIVE AUTOMATIC TRANSMISSION WITH EMERGENCY OPERATION FEATURE

[75] Inventors: Volker Kadelbach, Freiberg; Gerhard Will, Weinstadt; Joseph Sauer, Schwieberdingen, all of Fed. Rep. of Germany

[73] Assignee: Robert Bosch GmbH, Stuttgart, Fed. Rep. of Germany

[21] Appl. No.: 883,367

[22] Filed: Mar. 6, 1978

[30] Foreign Application Priority Data

Apr. 7, 1977 [DE] Fed. Rep. of Germany ....... 2715553

[51] Int. Cl.³ .............................................. F16H 3/74
[52] U.S. Cl. ................................... 74/752 A; 74/866; 74/752 D
[58] Field of Search ................ 74/752 A, 752 D, 866, 74/336 R, 365; 91/509, 459, 522

[56] References Cited

U.S. PATENT DOCUMENTS

| | | | |
|---|---|---|---|
| 3,877,346 | 4/1975 | Koopman et al. ..................... | 91/509 |
| 4,073,203 | 2/1978 | Wurst et al. ............................ | 74/866 |

Primary Examiner—C. J. Husar
Assistant Examiner—Frank McKenzie
Attorney, Agent, or Firm—Frishauf, Holtz, Goodman & Woodward

[57] ABSTRACT

To permit placing an electrical-hydraulical controlled automatic transmission, selectively, in reverse or neutral position upon failure of the control or command system, a spool valve is interposed between a fluid pressure pump and the control unit, the spool valve having three positions in which it can be placed manually; one of the positions is its normal operating position in which the valve provides a straight fluid path for pressurized fluid from the pump to the control unit; the other two positions are operable under emergency conditions, a second position providing a connection directly from the valve to the hydraulic servo units associated with control of the reverse gear, and the third interrupting suppply of hydraulic fluid from the pump to the control unit so that the control unit will, effectively, be placed in neutral position.

10 Claims, 1 Drawing Figure

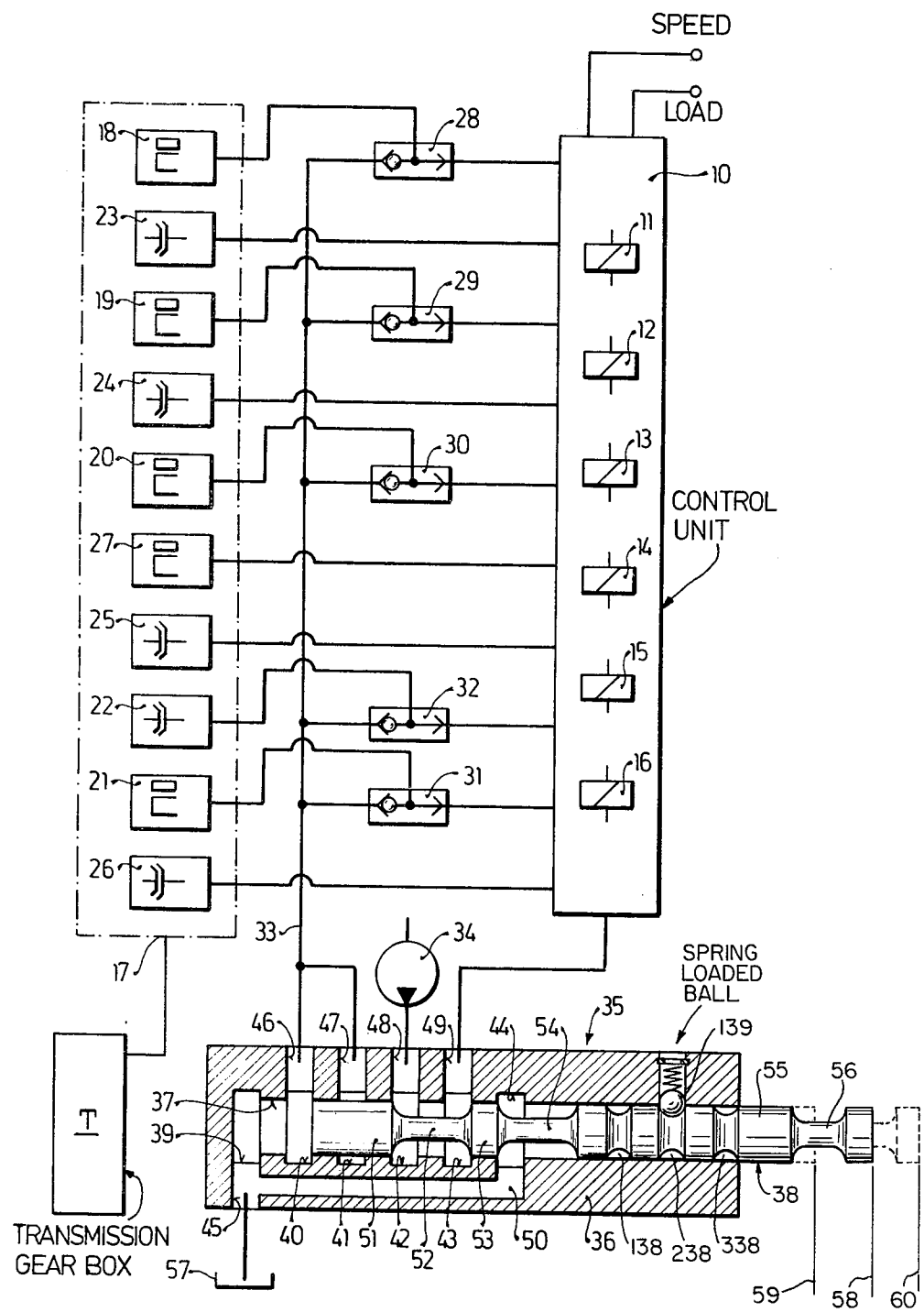

CONTROL SYSTEM FOR AUTOMOTIVE AUTOMATIC TRANSMISSION WITH EMERGENCY OPERATION FEATURE

Reference to related application, assigned to the assignee of the present application:
U.S. Ser. No. 621,513, Wurst et al, now U.S. Pat. No. 4,073,203, Feb. 14, 1978.

The present invention relates to control of automatic transmissions particularly for automotive vehicles and especially to control of electrically commanded automatic transmission for operation under emergency conditions.

BACKGROUND AND PRIOR ART

Many types of automatic transmissions use multiple gear sets, frequently planetary-type gears, with brakes and clutches, often in the form of bands. The respective brakes and clutches are operated by servo valves. The servo valves, in turn, can be controlled by an electrical control unit in dependence on selected operating conditions, vehicle speed, loading on the internal combustion engine, rapid acceleration conditions, or the like. Such units are constructed to be fail-safe, that is, if the electronic command system should fail, the highest possible gear range is commanded to be connected, usually the direct drive gear. This is generally the case if all the magnetic valves or servo valves are deenergized. This permits forward movement of the vehicle. It is not possible, however, to reverse or move the vehicle by pushing it. This is a disadvantage especially if the failure should occur while the vehicle is operated in traffic and can be removed from a traffic lane only by pushing or pulling, or by moving the vehicle rearwardly.

THE INVENTION

It is an object to provide an automatic gear change system which is so arranged that failure of an electronic control system will still permit movement of the vehicle not only in direct drive, forwardly, but additionally to place the gears in neutral condition or in reverse.

Briefly, the customary control system is expanded by a valve which is interposed between a source of pressure fluid, usually a hydraulic pump, and the control unit. This valve, preferably, a slider or spool valve, has three positions. One position is the normal one, in which the valve provides direct communication of pressurized fluid from the pump to the control unit. This is the position in which the valve is ordinarily maintained. The other two positions are emergency positions. The second position places a fluid path between the pump directly to the servo units associated with control of the reverse gear. A third position blocks communication of pressurized fluid from the pump to the control unit entirely, so that no pressure fluid at all is available for the transmission gear box servo units, thus placing the gear box in "neutral" position, permitting movement of the vehicle by pushing in either direction.

The system with the three-way valve has the advantage that, if the engine is operative, the vehicle can be moved rearwardly by manually engaging the reverse gear upon operation of the valve into the second position. Additionally, the vehicle can be moved by pushing or pulling in either direction, without requiring lifting the driven wheels off the road surface to prevent damage to the transmission. It is thus possible to move the vehicle out of the stream of traffic even though the control system may have failed at a most inopportune moment.

Drawings, illustrating a preferred example:

The single FIGURE is a highly schematic block diagram illustrating the valve including the system of the present invention, the remainder or conventional portions of the transmission and its control system being indicated only schematically.

Automatic transmissions or gear boxes frequently use a plurality of planetary gear units in which the respective gear range is controlled by operation of servo elements formed as brakes and clutches, respectively, which act on the sun gear, the planetary gear, or the ring gear of the respective drives by arresting, selectively, the elements of the gears themselves. The present invention is also applicable to other types of gears or automatic transmissions. The various servo elements are controlled by a plurality of magnetic valves which, in turn, are controlled by command signals derived from an electronic control unit. The electronic control unit, itself, commands the proper gear in accordance with signals derived from operating characteristics of the engine and of the vehicle, typically signals representative of engine speed and engine loading; other signals may also be used, such as "kickdown" signals commanding rapid acceleration or the like. The drawing shows merely two signals being applied to a main control unit 10, although others can be used. The drawing illustrates a control unit for a transmission gear box T having six speed or direction ranges with a Simpson set and three sets of planetary gears. The control unit 10 has six magnetic valves 11, 12, 13, 14, 15, 16 which are connected over suitable connecting lines to a group of servo elements 17. The servo elements 17 include brakes and clutches, and have first, second, third and fourth brakes 18, 19, 20, 21 and a first clutch 22. These are the servo elements which are used when reverse speed is commanded. The set 17 additionally has second, third, fourth and fifth clutches 23, 24, 25, 26 and a fifth brake 27. The servo elements 23, 24, 25, 26, 27 are necessary to engage gears moving the vehicle forwardly.

The pressure lines between the control unit 10 and the servo elements for reverse gear, that is, elements 18–22, have change-over valves 28, 29, 30, 31, 32 interposed therein. These valves permit application of pressure fluid to the respective servo elements either from the control unit 10, as controlled by the respective appropriate magnet valve therein, as well as from a pressure source derived from a pressure line 33. When line 33 is pressurized—under emergency conditions as will appear below—the reverse gear can thus be connected even though the electronic control of the respective valve in the control unit 10 is disabled.

Hydraulic operating pressure is derived from a pump 34. In accordance with the invention, a valve in form of a slider or spool valve 35 is provided. Valve 35 has a valve housing 36 in which a spool or control slider 38 is located, operating in an axial bore 37. The bore 37 is enlarged with a plurality of ring grooves, and has first, second, third, fourth, fifth and sixth ring grooves 39, 40, 41, 42, 43 and 44. The first groove 39 is connected to a first outlet 45; the second groove 40 is connected to a second outlet 46; the third groove 41 is connected to a third outlet 47; the fourth groove 42 is connected to a fourth outlet 48; and the fifth groove 43 is connected to a fifth outlet 49. The sixth groove 44 is connected to a duct 50 which leads to the first outlet 45. The outlet 45 is connected to a drain or sump 57.

The slider 38 is formed with a first tightly fitting portion 51; a second portion 52 of reduced diameter; a third portion 53 tightly fitting into bore 37; a fourth portion 54 with a reduced diameter; and a fifth portion 55 tightly fitting into bore 37. The end portion of spool 38 extends out of housing 36 and is formed with a sixth reduced portion 56.

The first outlet 45 is connected to the sump 57. The second and third outlets 46, 47 are connected to the "reverse" pressure line 33; the fourth outlet 48 is connected to pump 34; the fifth outlet 49 is connected to the control unit 10. In the example shown in the drawing, and as illustrated, all the grooves 39, 40, 41, 42, 43, 44 are formed with the same width. The distances of the respective grooves from each other along the longitudinal axis of the bore 37 have the same spacing as the width of the grooves 39, 40, 41, 42, 43, 44. The first section or portion 51 of spool 38 is three times as wide as a ring groove; the second, reduced-diameter portion 52 likewise is three times as wide as a ring groove; the third portion of the bore diameter 53 has the width of one ring groove; and the fourth portion 54 of reduced diameter likewise has three times the width of a ring groove. The fifth portion 55 of bore diameter is made so long that the end portion 56, of reduced diameter, is readily accessible manually to form a manual operating element. The end portion may additionally be formed with notches or punch marks 138, 238, 338 into which a spring-loaded ball 139 can snap to fix the slider in either one of three positions, as will appear. Any other way of holding the slider in predetermined positions can be used, for example selectively positionable spacer blocks engaging the end of the housing 36 and the reduced portion 56, and requiring, respectively, manual insertion or removal.

The slider 38 has three operating positions along its longitudinal, axial path in bore 37. The first position of slider 38 is associated with normal operation of the transmission gear box T, and normally the slider will be mechanically held in this position by engagement of ball 139 in groove 238. A second slider position 59 can be commanded, in which the slider is moved axially towards the left (with respect to the FIGURE), commanding engagement of the "reverse" gear; and a third slider position 60 is possible, establishing placing of the transmission gear box T into "neutral" position.

Operation: Let it be assumed that the slider in its "normal" or usual operating condition, as identified by the dimension line 58 in the FIGURE. Pump 34 is connected through inlet 48, groove 42, the reduced section 52 of the slider, groove 43 and outlet 49 with the control unit 10. The reverse pressure line 33 is separated from the pump and communicates with the drain through groove 40; it is depressurized. This position is the normal operating position. The valves 11 to 16, as controlled by vehicle operating signals, for example speed and load signals, will command respective operation of the elements 18–27 in the servo unit 17, as customary and well known. If the electronic command should fail while the slider is in the position 58 then, as is customary, the servo elements in the unit 17 will place the highest gear range of the transmission gear box T in operation. The check valve feature of the change-over valves 28–32 ensures that no pressurized fluid can be applied from the control unit 10 through the line 33 to the sump 57, thus maintaining fluid pressure for operation of the transmission at the highest gear range.

If it should be necessary to move the vehicle backwards, then the slider or spool 38 is manually moved to the left, with respect to the FIGURE, that is, into position 59. Pump 34 is now connected through groove 42, the reduced section 52 of the spool with the outlet 47 and hence with the "reverse" pressure line 33. This pressurizes the check side of the change-over valves 28-31 and provides pressure fluid to the respective elements 18-22. Simultaneously, the control unit 10 is connected through groove 43, reduced section 54, and duct 50 with the sump or drain 57, and thus is depressurized. The check valve features of the change-over valves 28-32 prevent in any event flow of pressurized fluid from the "reverse" pressure line 33 back to the control unit 10 and possible drainage of fluid to the sump 57. Thus, moving the spool 38 to the left permits manual insertion of the reverse gear of the transmission gear box T.

In the third slider position, spool 38 is pulled outwardly towards the right, into the dotted-line position 60. Supply of pressurized fluid from pump 34 to any outlet is now entirely blocked. The control unit 10 is depressurized by communication of groove 43 through the reduced portion 52 of the spool and duct 50 to the sump; likewise, line 33 remains in communication through groove 40 and outlet 39 with sump 57. Both the control unit 10 as well as the "reverse" pressure line 33 are depressurized. Since no servo unit has any fluid pressure applied, the transmission gear box will be placed in "neutral" position, permitting pushing or pulling the vehicle in either direction.

Various changes and modifications may be made within the scope of the inventive concept.

We claim:

1. Control system for an automotive, automatic magnetically controlled gear change transmission (T) and permitting operation of the transmission under emergency condition upon failure of automatic control having means (34) providing a source of pressurized hydraulic fluid;

a hydraulic servo unit (17) including a plurality of hydraulic servo elements (18-27);

and an automatic control unit (10) including a plurality of electrically controlled valves (11-16), said valves selectively controlling said servo elements upon selective energization of said valves to command engagement of selected gears of the transmission (T) in accordance with selected operation of the controlled valves, and comprising, in accordance with the invention, a valve means (35) interposed between the pressure fluid source (34) and the control unit (10) having three positions (58, 59, 60), said valve means controlling application of pressure fluid from said source (34), selectively, (1) when the valve is in a first position (58) forming the position for normal operation, to the control unit (10), to provide for control of the servo elements by said valves of the control unit, (2) when the valve is in a second position (59), directly to the servo elements (18, 19, 20, 21, 22) controlling placement of the transmission gear box (T) in "reverse" gear, and (3) when the valve is in a third position (60), interrupting application of pressurized fluid to the control unit (10) and hence to the servo unit (17)

whereby the transmission (T) will be placed in disengaged or "neutral" position.

2. System according to claim 1, wherein said valve means is a slider valve.

3. System according to claim 1, wherein said valve means comprises a valve housing (36) formed with a bore therein, and said valve is a spool valve and comprises a slider spool (38) axially movable in said bore.

4. System according to claim 3, wherein the bore (37) is enlarged at selected axial positions with a plurality of ring grooves (39–44);

outlet openings (45–49) being connected to said ring grooves (39–44);

and wherein said slider is formed with first, third and fifth portions (51, 53, 55) tightly fitting into the bore (37), and second and fourth portions (52, 54) axially located between the first and third, and third and fifth portions, respectively, and having a diameter smaller than the diameter of the bore to permit fluid communication along said section of reduced diameter.

5. System according to claim 4, wherein a first groove (39) has a first opening (45) associated therewith, said first opening (45) being connected to a pressure drain or sump (57);

a "reverse" pressure line (33) is provided, connected to the servo units (18–22) associated with control of reverse gear of the transmission (T);

a third groove (41) associated with a third opening (47) is connected to the "reverse" pressure line (33);

a fourth groove (42) associated with a fourth opening (48) is connected to the fluid pressure source (34);

a fifth groove (43) associated with a fifth opening (49) is connected to the control unit (10);

and a duct is formed connecting the sixth groove (44) with the drain or sump (57).

6. System according to claim 5, wherein the grooves (39–44) have the same width;

the lands between the grooves have the same width and have a width equal to that of the grooves;

the first, second and fourth portions (51, 52, 54) of the slider spool (38) are each three times as wide as a groove, or land, respectively;

and the third portion (53) of the slider spool (38) has the same width as the width of a groove, or land, respectively.

7. System according to claim 1, including connecting lines between respective control valves (11–16) of the control unit (10) and servo elements (18–27) of the servo unit (17) for selective pressurization in accordance with a commanded gear range of the transmission (T);

and including, in accordance with the invention, change-over check valves (28–32) included in the connection lines between the controlled valves and those servo elements (18, 19, 20, 21, 22) which control placing the transmission (T) in "reverse" condition, said change-over check valves being connected to the "reverse" pressure line (33) to permit, selectively, application to said servo elements of pressurized fluid either from the control unit (10) or from the valve means (35) if the valve means is placed in the second position (59) establishing communication of pressurized fluid between the pressure fluid source (34) and the "reverse" pressure line.

8. System according to claim 5, including connecting lines between respective control valves (11–16) of the control unit (10) and servo elements (18–27) of the servo unit (17) for selective pressurization in accordance with a commanded gear range of the transmission (T);

and including, in accordance with the invention, change-over check valves (28–32) included in the connection lines between the controlled valves and those servo elements (18, 19, 20, 21, 22) which control placing the transmission (T) in "reverse" condition, said change-over check valves being connected to the "reverse" pressure line (33) to permit, selectively, application to said servo elements of pressurized fluid either from the control unit (10) or from the valve means (35) if the valve means is placed in the second position (59) establishing communication of pressurized fluid between the pressure fluid source (34) and the "reverse" pressure line.

by establishing communication between the fourth groove (42) and third groove (41) and the second portion (52) of reduced diameter of the spool or slider (38) while inhibiting communication between the second groove (40) and the first groove (39) and the first outlet to the drain or sump (57) by the first portion (51) of the spool or slider fitting tightly in the bore (37).

9. System according to claim 1, further including means arresting said valve means, selectively, in either of said three positions.

10. System according to claim 8, further including means arresting said valve means, selectively, in either of said three positions.

* * * * *